(12) United States Patent
Nawrocki (10) Patent No.: US 8,308,613 B1
(45) Date of Patent: Nov. 13, 2012

(54) COMBINATION BRAKE AND ACCELERATOR PEDAL ASSEMBLY

(76) Inventor: Ryszard Nawrocki, Rio Rancho, NM (US)

( * ) Notice: Subject to any disclaimer, the term of this patent is extended or adjusted under 35 U.S.C. 154(b) by 554 days.

(21) Appl. No.: 12/508,432

(22) Filed: Jul. 23, 2009

(51) Int. Cl.
*F02D 9/06* (2006.01)
(52) U.S. Cl. ......... 477/186; 477/203; 477/207; 477/211
(58) Field of Classification Search .................. 477/186, 477/203, 205–207, 210, 211
See application file for complete search history.

(56) References Cited

U.S. PATENT DOCUMENTS

| | | | | |
|---|---|---|---|---|
| 3,207,276 A * | 9/1965 | Wing et al. | .................... | 477/207 |
| 4,020,931 A | 5/1977 | Sertori | | |
| 4,146,108 A | 3/1979 | Sato | | |
| 4,885,960 A * | 12/1989 | Maeda et al. | .................. | 477/114 |
| 4,890,686 A * | 1/1990 | Hamada et al. | ............... | 180/233 |
| 5,091,857 A * | 2/1992 | Katayama et al. | ............ | 701/112 |
| 5,293,976 A | 3/1994 | Naruse | | |
| 5,693,927 A | 12/1997 | Wilson | | |
| D425,838 S | 5/2000 | Hussaini | | |
| 6,283,240 B1 * | 9/2001 | Beever | .......................... | 180/178 |
| 6,296,327 B1 | 10/2001 | Linkenbach | | |
| 6,702,718 B2 * | 3/2004 | Tani et al. | ..................... | 477/203 |
| 6,918,854 B2 * | 7/2005 | Okada et al. | .................. | 477/114 |
| 6,919,801 B2 * | 7/2005 | Kim | .............................. | 340/479 |
| 7,041,030 B2 * | 5/2006 | Kuroda et al. | .................. | 477/21 |
| 7,443,116 B2 * | 10/2008 | Kutsuna et al. | ............... | 318/139 |

\* cited by examiner

*Primary Examiner* — Ha D. Ho (57) ABSTRACT

A combination brake pedal and an accelerator pedal assembly allowing the vehicle to be driven with both feet comprising a brake and an accelerator, the accelerator being operatively connected to an engine control lever that moves between an engaged and a disengaged position, when the accelerator is pressed the engine control lever moves to the engaged position to accelerate the vehicle, when the accelerator is not pressed the engine control lever moves to the disengaged position so the vehicle does not accelerate; and an accelerator pedal disengagement device operatively connected to the brake and accelerator for moving the engine control lever to the disengaged position when the brake pedal is pushed, wherein the accelerator pedal disengagement device prevents the accelerator pedal from causing the engine control lever to move to the engaged position when both the accelerator pedal and brake pedal are pressed.

2 Claims, 7 Drawing Sheets

FIG. 7
(Electric Car Version)

US 8,308,613 B1

COMBINATION BRAKE AND ACCELERATOR PEDAL ASSEMBLY

FIELD OF THE INVENTION

The present invention is directed to an assembly that combines a brake device and an accelerator device allowing a user to operate a vehicle with both feet. The assembly may help improve safety by improving a driver's reaction time when braking and also prevent the accelerator pedal and brake pedal from simultaneously fighting each other.

BACKGROUND OF THE INVENTION

Automatic transmission vehicles are currently designed such that drivers operate the vehicle with one foot. The driver uses his/her right foot to press on the accelerator when he/she needs to accelerate, and when he/she need to brake, he/she moves his/her right foot to press down on the brake pedal.

The present invention features a combination brake and accelerator pedal assembly for allowing a user to operate a vehicle with both feet. The user can use his right foot to press on the accelerator and can use his left foot to press on the brake pedal. The assembly can help prevent an individual from unintentionally pressing upon the accelerator when he/she intends to push on the brake.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a combination brake and accelerator pedal assembly for use in an automatic transmission vehicle. The assembly comprises a brake pedal and an accelerator pedal, the accelerator pedal being operatively connected to an engine control lever that moves between an engaged position and a disengaged position, wherein when the accelerator pedal is pressed the engine control lever moves to the engaged position where the engine control lever causes the vehicle to accelerate, wherein when the accelerator pedal is not pressed the engine control lever moves to the disengaged position where the engine control lever does not cause the vehicle to accelerate; and an accelerator pedal disengagement device operatively connected to the brake pedal and to the accelerator pedal for moving the engine control lever to the disengaged position when the brake pedal is pushed, wherein the accelerator pedal disengagement device prevents the accelerator pedal from causing the engine control lever to move to the engaged position when both the accelerator pedal and brake pedal are pressed; wherein the assembly allows a user to operate the vehicle with both feet.

In some embodiments, the accelerator pedal disengagement device comprises a lever, wherein the brake pedal is operatively connected to a first end of the lever and the accelerator pedal is operatively connected to a second end of the lever, wherein when the accelerator pedal is pressed the lever moves to a first position that corresponds to the engine control lever being moved to the engaged position, wherein when the brake pedal is pressed the lever moves to a second position that corresponds to the engine control lever being moved back to the disengaged position In some embodiments, the assembly comprises a microprocessor operatively connected to the brake pedal and to the accelerator pedal. In some embodiments, the microprocessor blocks electric current going to the vehicle's engine when the brake pedal is applied. In some embodiments, the microprocessor is configured to receive a first input signal from the brake pedal when the brake pedal is being pressed after which the microprocessor can generate a first output signal to the accelerator pedal disengagement device to turn on the accelerator pedal disengagement device; and receive a second input signal from the brake pedal when the brake pedal is not being pressed after which the microprocessor can generate a second output signal to the accelerator pedal disengagement device to turn off the accelerator pedal disengagement device.

In some embodiments, the assembly is constructed for an electric vehicle, a hybrid vehicle, or the like. In some embodiments, the microprocessor is operatively connected to a radar device configured to monitor distance between the vehicle and another vehicle in front. In some embodiments, the microprocessor is configured to receive a third input signal from the radar device when the radar device detects that the vehicle in front is too close to the vehicle after which the microprocessor can generate an output command to the accelerator pedal disengagement device to turn on the accelerator pedal disengagement device.

DESCRIPTION OF PREFERRED EMBODIMENTS

The following is a listing of numbers corresponding to a particular element refer to herein:
100 brake pedal and accelerator pedal assembly
110 accelerator pedal
150 brake pedal
180 accelerator regulator lever
200 connecting rod
201 first end of connecting rod
202 second end of connecting rod
230 link rod
310 first spring housing
320 first spring
350 first pushrod
351 first end of first pushrod
352 second end of first pushrod
410 piston
420 second pushrod
430 third pushrod
450 second spring
460 bushing 510 lever
511 first end of lever
512 second end of lever
515 fixed axis
620 engine control lever
621 top end of engine control lever
622 bottom end of engine control lever
661 first position of engine control lever
662 second position of engine control lever
710 first regulator spring
720 second regulator spring
750 solenoid
760 battery
770 wire Referring now to FIGS. 1-7, the present invention features a combination brake and accelerator pedal assembly 100 for use in an automatic transmission vehicle. The assembly 100 allows a user to operate the vehicle with both feet as opposed to just one. The assembly 100 can help prevent an individual from unintentionally pressing upon the accelerator when he/she intends to push on the brake. Without wishing to limit the present invention to any theory or mechanism, it is believed that the assembly 100 of the present invention is advantageous because it may help improve a driver's reaction time when braking. This may increase safety for both the driver and passengers. The assembly 100 allows the accelerator pedal to be pressed with the right foot and the brake pedal to be pressed with the left foot while preventing the engine power and brake from simultaneously fighting each other.

The combination brake pedal and accelerator pedal assembly 100 generally comprises a brake pedal 150, an accelerator pedal 110, an accelerator pedal disengagement device (controlled by the brake pedal 150), and an onboard microprocessor controller. The brake pedal 150 and accelerator pedal 110 are spaced further apart than the current spacing of the brake pedal and accelerator pedal (see FIG. 6). This allows for the operation of the vehicle with both feet without mistakenly pressing on the accelerator while the driver intends to brake (or vice versa).

The assembly 100 further comprises an accelerator pedal disengagement device for allowing the accelerator pedal 110 to be disengaged if the brake pedal 150 is simultaneously pressed. In some embodiments, the accelerator pedal disengagement device causes the throttle to return to the idle position. In some embodiments, the accelerator pedal disengagement device physically blocks the accelerator from being pressed.

In some embodiments, the assembly 100 comprises an onboard microprocessor controller for controlling the timing of the accelerator pedal disengagement device. In some embodiments, the microprocessor controller may instantaneously block the electric current that goes to the engine if the brake pedal 150 is applied.

The microprocessor is operatively connected to the brake pedal 150 and the accelerator pedal 110. The microprocessor is configured to receive a first input signal from the brake pedal 150 when the brake pedal 150 is being pressed. Upon receipt of the first input signal, the microprocessor can generate a first output signal to the accelerator pedal disengagement device to turn on the accelerator pedal disengagement device. This prevents the accelerator from functioning. In some embodiments, the microprocessor is configured to receive a second input signal from the brake pedal 150 when the brake pedal 150 is not being pressed. Upon receipt of the second input signal, the microprocessor can generate a second output signal to the accelerator pedal disengagement device to turn off the accelerator pedal disengagement device.

The microprocessor is also operatively connected to a power source (e.g., the battery of the vehicle).

Figure 1:
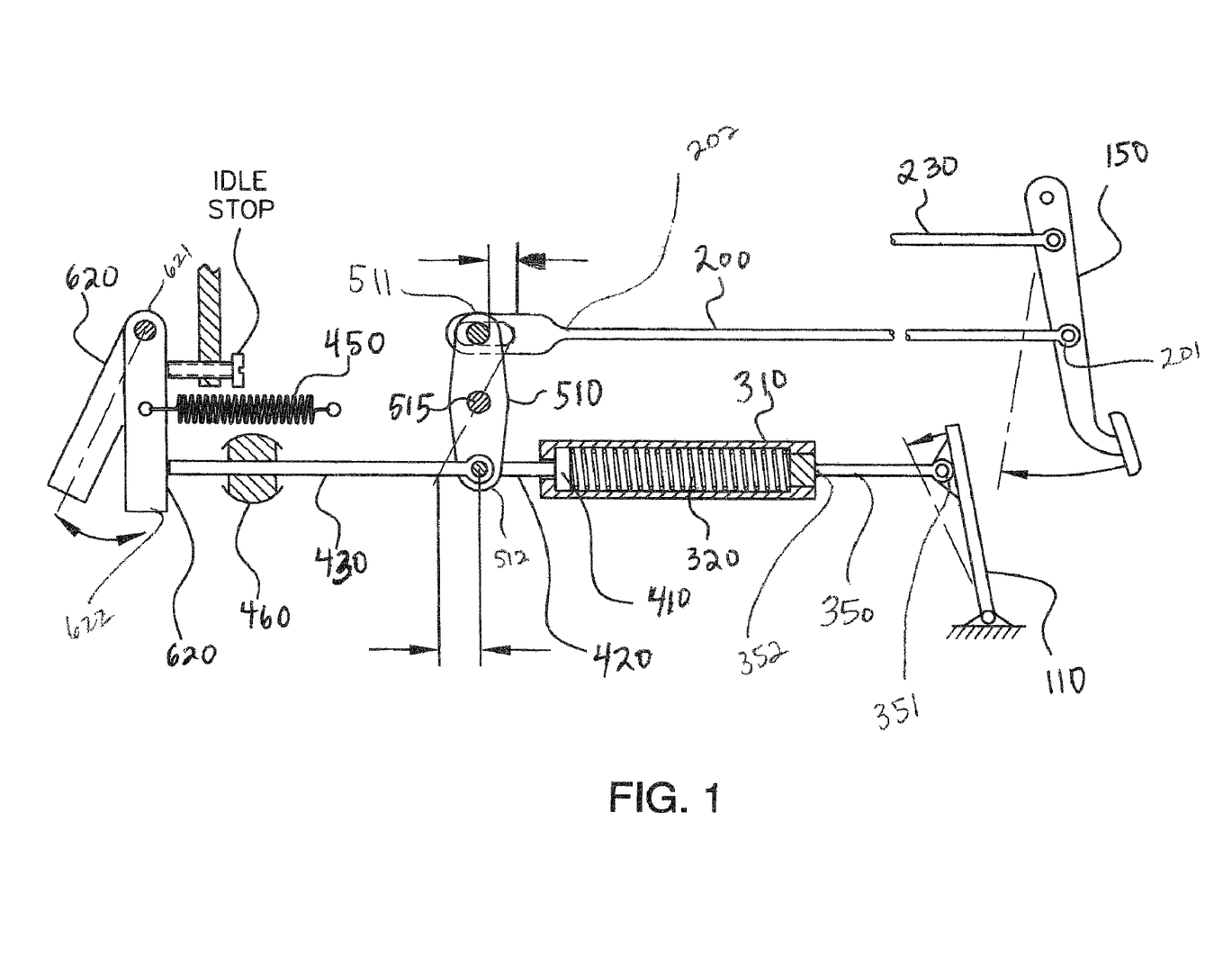
FIG. 1 is a side view of the brake pedal and accelerator pedal assembly of the present invention.
Figure 2:
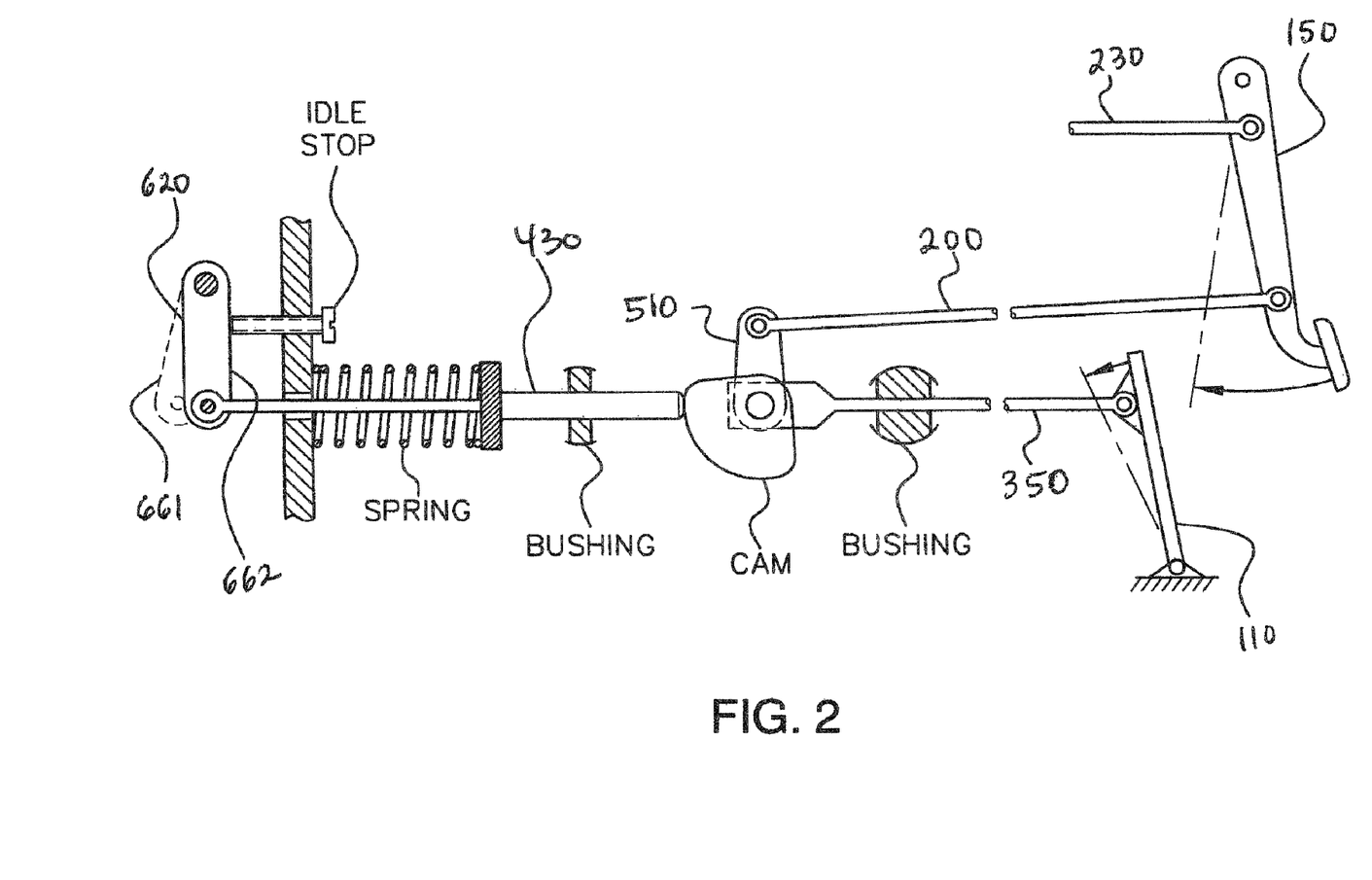
FIG. 2 is a side view of the assembly of the present invention.

As shown in FIG. 1 and FIG. 2, in some embodiments, the assembly 100 of the present invention comprises an accelerator pedal 110 connected to the first end 351 of a first pushrod 350. The second end 352 of the first pushrod 350 is attached to a first spring 320 in a first spring housing 310, wherein the first spring 320 can push on a piston 410. The piston 410 is connected to a second pushrod 420, which is attached generally perpendicularly to the second end 512 of a lever 510 that can pivot about a fixed axis 515 between a first position and a second position.

The brake pedal 150 is attached to the first end 201 of a connecting rod 200. The second end 202 of the connecting rod 200 is attached to the first end 511 of the lever 510. When the accelerator 110 is pushed, the lever 510 moves to the first position, which corresponds to the accelerator functioning to accelerate the vehicle. When the brake pedal 150 is pressed, the lever 510 moves to the second position, which corresponds to the accelerator not functioning to accelerate the vehicle. In some embodiments, the lever 510 is biased in the second position caused by a second regulator spring 720.

Disposed perpendicularly on the second end 512 of the lever 510 (and opposite the second pushrod 420) is a third pushrod 430. The third pushrod 430 connects to the bottom end 622 of an engine control lever 620. The engine control lever 620 causes the engine to accelerate. The engine control lever 620 can pivot between an engaged position (e.g., causing the engine to accelerate) and a disengaged position (e.g. not causing the engine to accelerate). In some embodiments, the engine control lever 620 is biased in the disengaged position caused by a second spring 450.

When the third pushrod 430 is pushed by the lever 510 (e.g., when the accelerator 110 is pushed and the lever 510 moves to the first position), the third pushrod 430 pivots the engine control lever 620 to the engaged position. When the user stops pressing on the accelerator 110, the lever 510 moves back to the second position and the engine control lever 620 returns to the disengaged position, thus the engine does not accelerate.

As shown in FIG. 2, in some embodiments, the accelerator 110 is connected to a cam via the first pushrod 350. When the accelerator 110 is pushed, the cam pushes the third pushrod 430 to move the engine control lever to the engaged position. In some embodiments, the connecting rod 200 of the brake pedal 150 also connects to the cam. When the brake pedal 150 is pushed, the cam slides away from the third pushrod 430 thereby preventing the accelerator 110 from causing the engine control lever to move to the engaged position. When the brake pedal 150 is released, the cam can return to its original position and the accelerator 110 can cause the engine control lever to be engaged.

Figure 5:
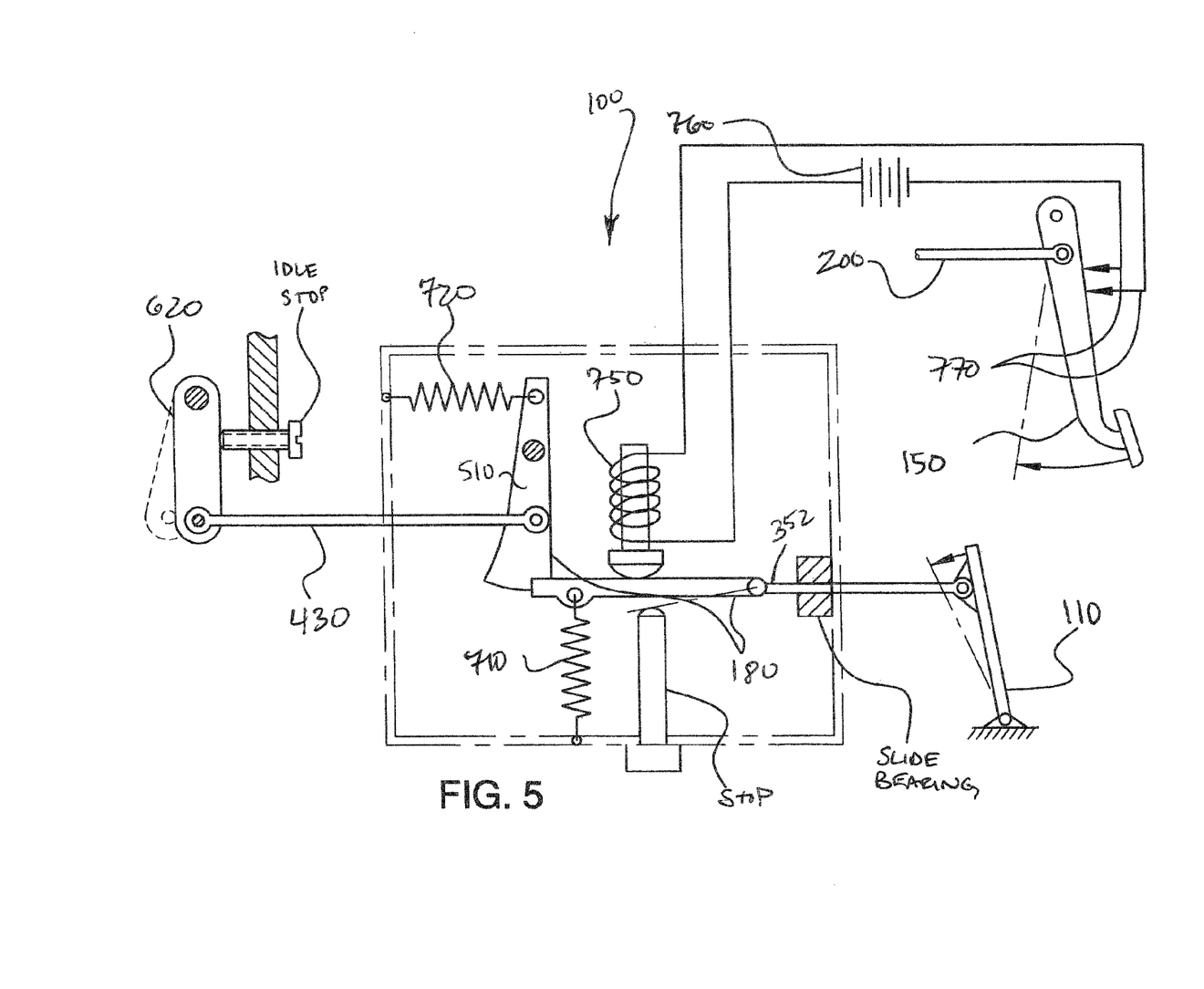
FIG. 5 is a side view of the electrical components of the assembly of the present invention.
Figure 6:
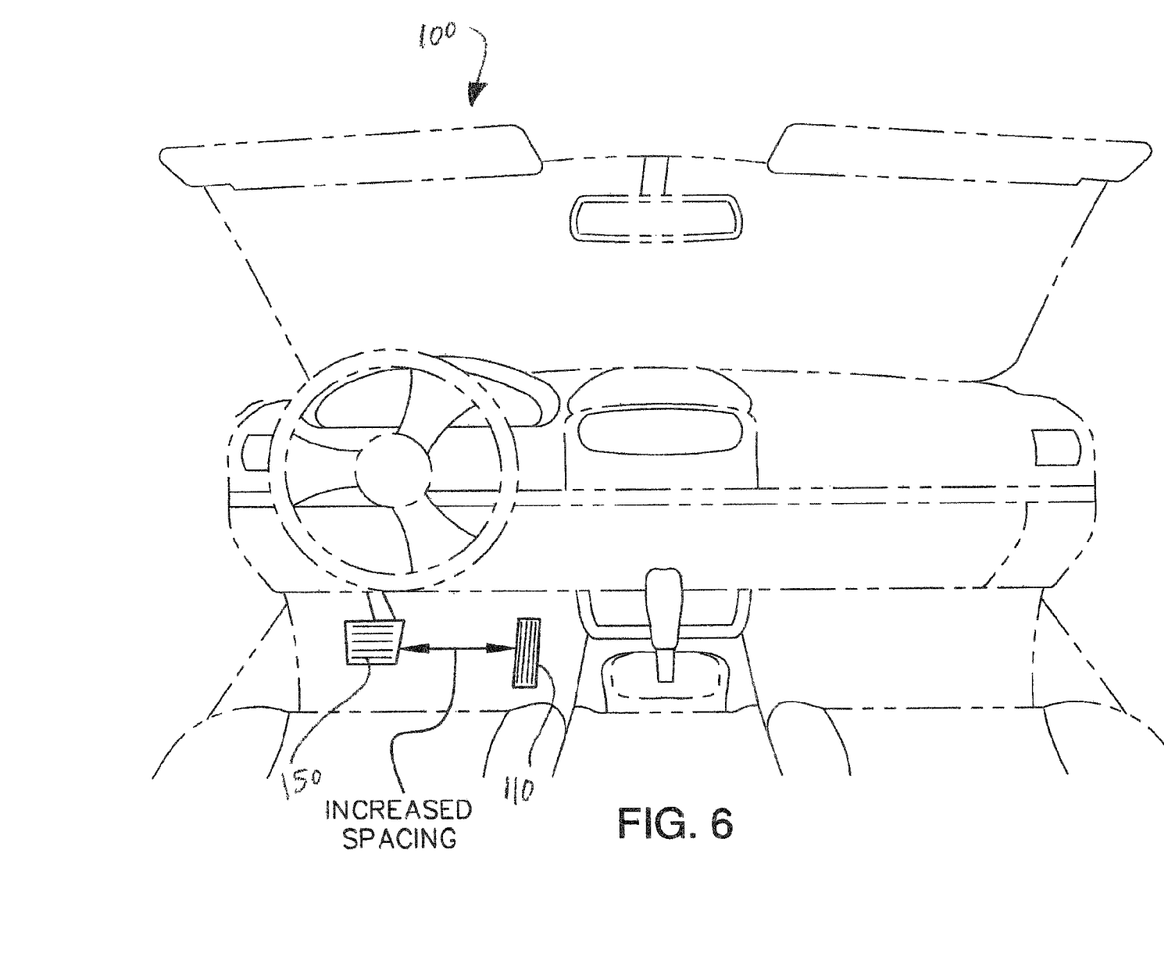
FIG. 6 is a front view of the assembly of the present invention.

As shown in FIG. 5, in some embodiments, the second end 352 first pushrod 350 is connected to an accelerator regulator lever 180, which can engage the lever 510. When the accelerator 110 is pushed, the accelerator regulator lever 180 is pushed forwardly which pushes on the lever 510 to move it to the first position. This causes the third pushrod 430 to push the engine control lever 620 to the engaged position. The vehicle can accelerate normally.

In some embodiments, the accelerator regulator lever 180 can move in a third and fourth direction (e.g., upwardly and downwardly). For example, the accelerator regulator lever 180 can move from an engaged position (e.g., when the accelerator regulator lever 180 engages the lever 510) downwardly to a disengaged position (e.g., the accelerator regulator lever 180 cannot engage the lever 510. In some embodiments, the accelerator regulator lever 180 is biased in the engaged position caused by a first regulator spring 710.

In some embodiments, the brake 150 is operatively connected to a solenoid 750 that can cause the accelerator regulator lever 180 to move from the engaged position to the disengaged position. In some embodiments, application of the brake 150 thus causes the lever 510 to fail to move to the first position so that the vehicle cannot accelerate. In some embodiments, the brake 150 and/or solenoid 750 is operatively connected to a power source (e.g., vehicle battery 760) via one or more wires 770.

Figure 3:
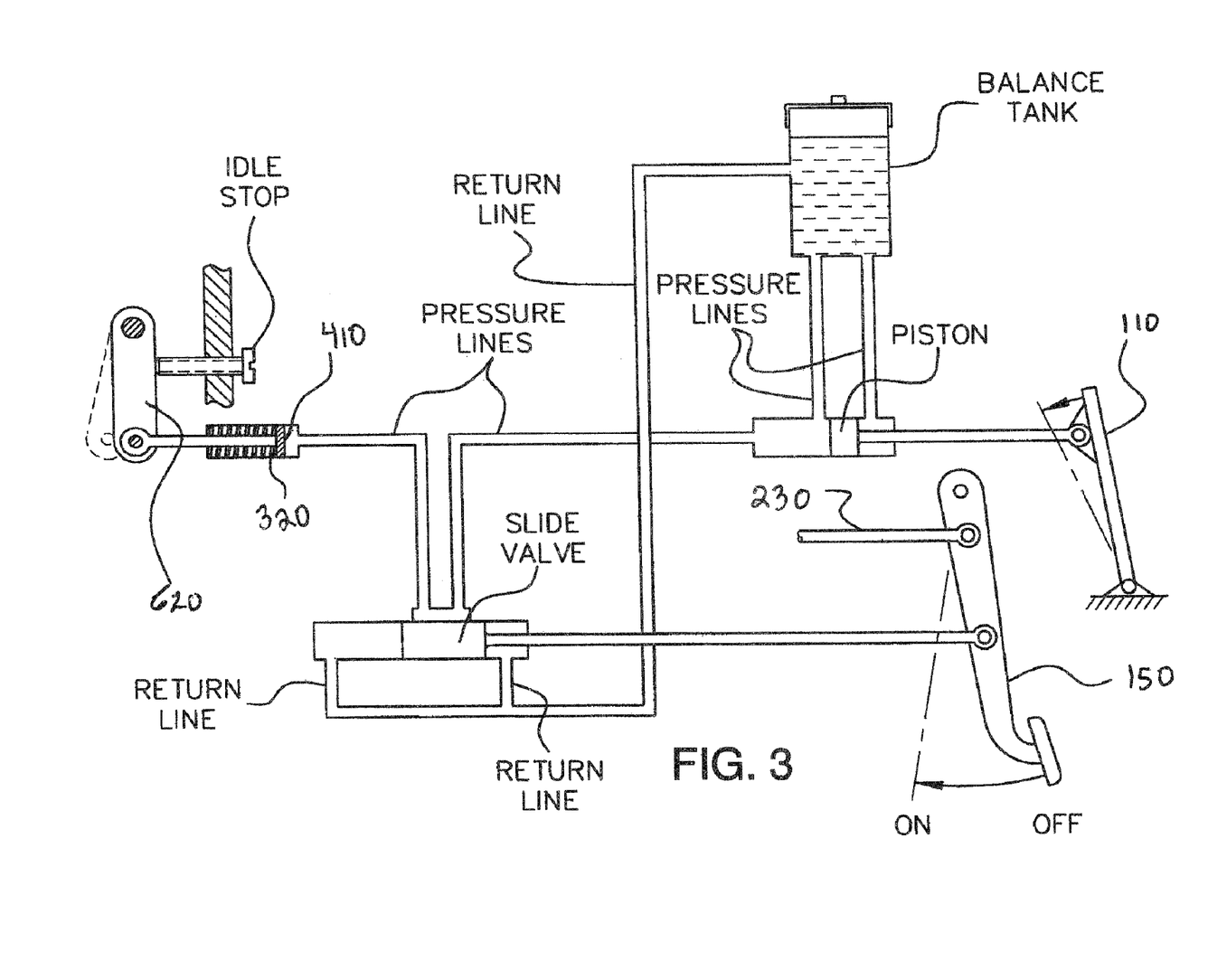
FIG. 3 is a side view of the assembly of the present invention.
Figure 4:
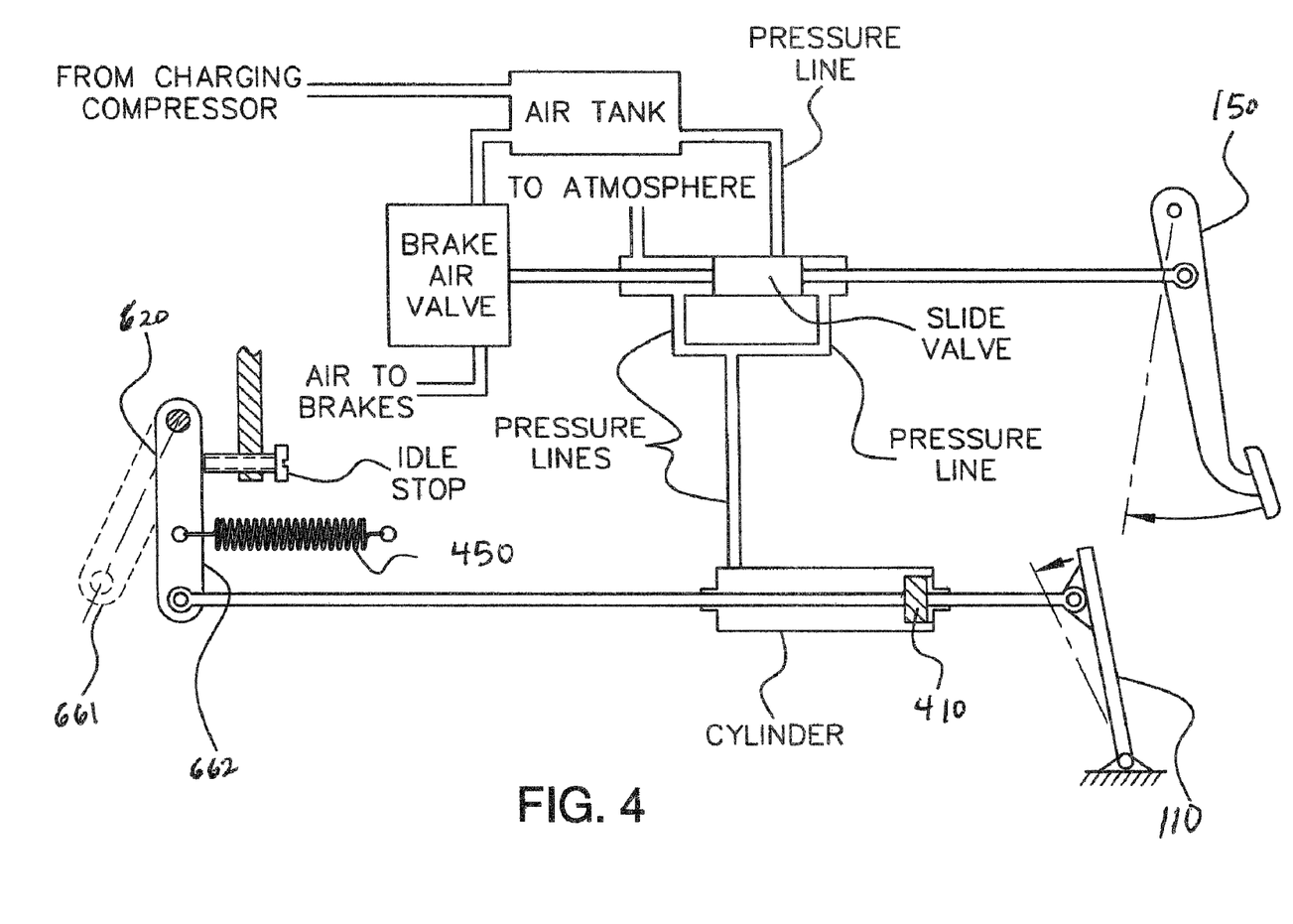
FIG. 4 is a side view of the assembly of the present invention.

As shown in FIGS. 3 and 4, in some embodiments, a hydraulic system comprising pressure lines, return lines, a plurality of valves, and a balance tank regulate the accelerator pedal 110 and the brake pedal 150. The accelerator pedal 110 is connected to the balance tank via a first and second pressure line, a cylinder, and a piston attached to the accelerator pedal. The brake pedal 150 is connected to the balance tank via a first and second return line and a slide valve connected to the brake pedal.

Figure 7:
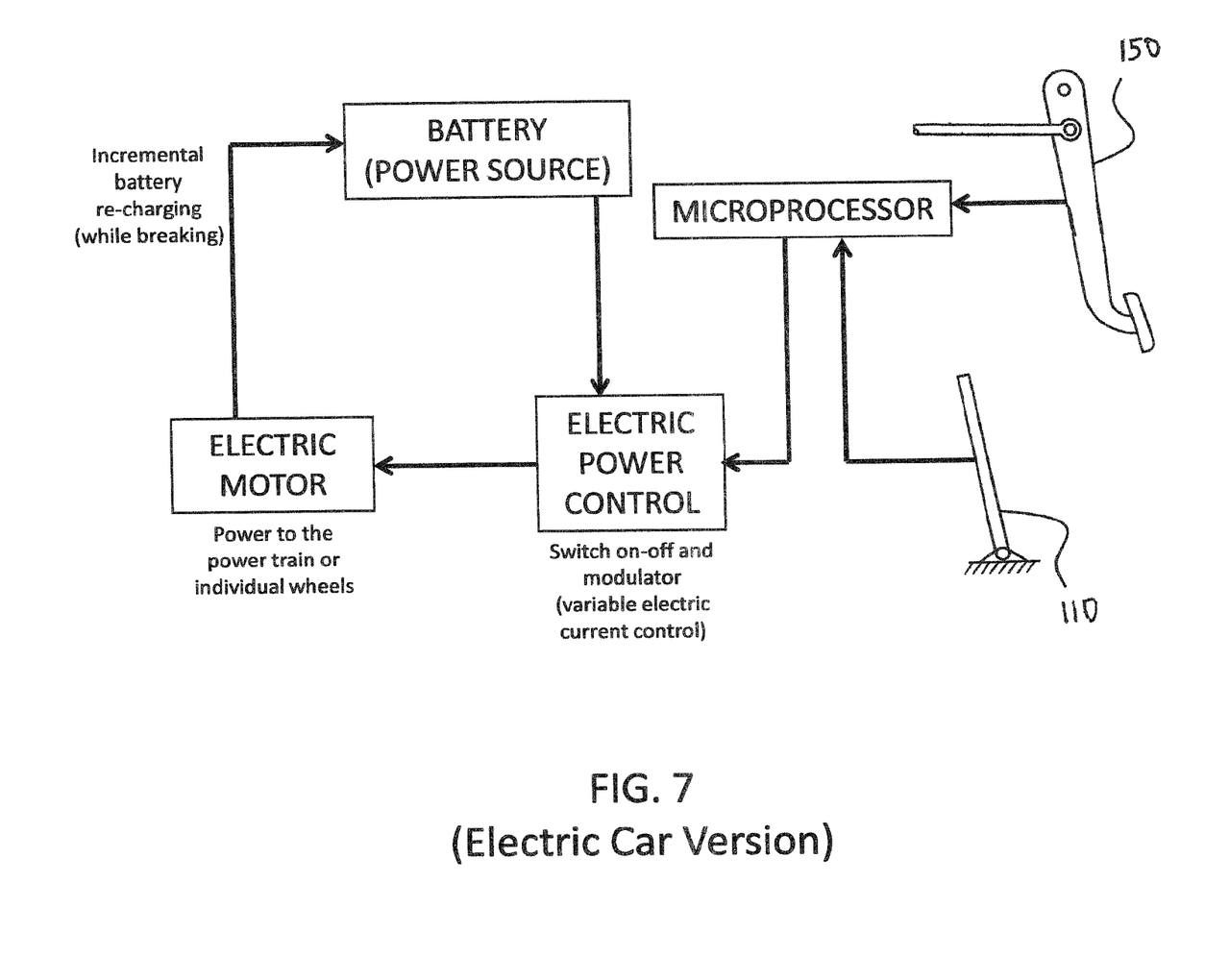
FIG. 7 is a schematic representation of components of the assembly of the present invention as used in an electric vehicle.

The assembly 100 of the present invention may be constructed for an electric vehicle (or hybrid vehicle or the like). When the brake is applied, the brake signals to the microprocessor which subsequently blocks input from the accelerator pedal input. For example, the microprocessor blocks electric current to the electric motor instantaneously if the brake pedal is applied rapidly and hard. In some embodiments, the microprocessor reduces the amount of current to the electric motor if the brake pedal is applied gently. In some embodiments, the electric motor functions as a generator and re-supplies the battery when the vehicle is in motion and no current is drawn for vehicle propulsion.

In some embodiments, the microprocessor is operatively connected to a radar device that is configured to monitor the distance between the vehicle and another vehicle in front. In some embodiments, the microprocessor controller is configured to receive a third input signal from the radar device when the radar device detects that a car is too close to the front of the vehicle. Upon receipt of the third input signal, the microprocessor may generate an output command to the accelerator pedal disengagement device to turn on the accelerator pedal disengagement device (to disengage the accelerator). This may help a driver maintain a safe distance behind a vehicle and help prevent rear-end collisions.

The following the disclosures of the following U.S. Patents are incorporated in their entirety by reference herein: U.S. Pat. No. 5,693,927; U.S. Pat. No. 6,296,327 B1; U.S. Pat. No. 5,293,967; U.S. Pat. No. 4,146,108; U.S. Pat. No. 4,020,931.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination brake and accelerator pedal assembly for use in an automatic transmission vehicle, said assembly comprising:

(a) a brake pedal and an accelerator pedal, the accelerator pedal being operatively connected to an engine control lever that moves between an engaged position and a disengaged position, wherein when the accelerator pedal is pressed the engine control lever moves to the engaged position where the engine control lever causes the vehicle to accelerate, wherein when the accelerator pedal is not pressed the engine control lever moves to the disengaged position where the engine control lever does not cause the vehicle to accelerate; and (b) an accelerator pedal disengagement device operatively connected to the brake pedal and to the accelerator pedal for moving the engine control lever to the disengaged position when the brake pedal is pushed, wherein the accelerator pedal disengagement device mechanically prevents the accelerator pedal from causing the engine control lever to move to the engaged position when both the accelerator pedal and brake pedal are pressed;

wherein the assembly allows a user to operate the vehicle with both feet;

wherein the accelerator pedal disengagement device comprises a lever, wherein the brake pedal is operatively connected to a first end of the lever and the accelerator pedal is operatively connected to a second end of the lever, wherein when the accelerator pedal is pressed the lever moves to a first position that corresponds to the engine control lever being moved to the engaged position, wherein when the brake pedal is pressed the lever moves to a second position that corresponds to the engine control lever being moved back to the disengaged position.

2. A combination brake and accelerator pedal assembly for use in an automatic transmission vehicle, said assembly comprising:

(a) a brake pedal and an accelerator pedal, the accelerator pedal being operatively connected to an engine control lever that moves between an engaged position and a disengaged position, wherein when the accelerator pedal is pressed the engine control lever moves to the engaged position where the engine control lever causes the vehicle to accelerate, wherein when the accelerator pedal is not pressed the engine control lever moves to the disengaged position where the engine control lever does not cause the vehicle to accelerate; and (b) an accelerator pedal disengagement device operatively connected to the brake pedal and to the accelerator pedal for moving the engine control lever to the disengaged position when the brake pedal is pushed, wherein the accelerator pedal disengagement device mechanically prevents the accelerator pedal from causing the engine control lever to move to the engaged position when both the accelerator pedal and brake pedal are pressed;

wherein the assembly allows a user to operate the vehicle with both feet;

wherein the accelerator pedal disengagement device comprises a lever, wherein the brake pedal is operatively connected to a first end of the lever and the accelerator pedal is operatively connected to a second end of the lever, wherein when the accelerator pedal is pressed the lever moves to a first position that corresponds to the engine control lever being moved to the engaged position, wherein when the brake pedal is pressed the lever moves to a second position that corresponds to the engine control lever being moved back to the disengaged position;

wherein the lever is biased in the second position caused by a second regulator spring.

* * * * *